United States Patent
Orf

(10) Patent No.: US 8,007,188 B2
(45) Date of Patent: Aug. 30, 2011

(54) STABILIZED MOUNT FOR, AND METHOD OF, STEADILY SUPPORTING A MOTION-SENSITIVE, IMAGE CAPTURE DEVICE

(75) Inventor: Hans Robert Orf, Simi Valley, CA (US)

(73) Assignee: The Tiffen Company LLC, Hauppauge, NY (US)

( * ) Notice: Subject to any disclaimer, the term of this patent is extended or adjusted under 35 U.S.C. 154(b) by 309 days.

(21) Appl. No.: 12/508,873

(22) Filed: Jul. 24, 2009

(65) Prior Publication Data

US 2011/0019992 A1 Jan. 27, 2011

(51) Int. Cl.
*G03B 17/00* (2006.01)
*F16M 11/02* (2006.01)

(52) U.S. Cl. .................... 396/419; 248/177.1

(58) Field of Classification Search ........ 396/419, 396/424, 428; 248/163.1, 177.1, 178.1, 183.1; 352/243; 348/373
See application file for complete search history.

(56) References Cited

U.S. PATENT DOCUMENTS

| | | | | |
|---|---|---|---|---|
| 4,341,452 A | * | 7/1982 | Korling | 396/428 |
| 5,187,744 A | * | 2/1993 | Richter | 379/449 |
| 5,229,798 A | * | 7/1993 | Brown | 352/243 |
| 5,870,642 A | * | 2/1999 | Mittelstaedt et al. | 396/428 |
| 6,427,959 B1 | * | 8/2002 | Kalis et al. | 248/288.11 |
| D566,590 S | * | 4/2008 | Stevens et al. | D10/74 |
| 2004/0257464 A1 | * | 12/2004 | Pandit et al. | 348/373 |
| 2005/0098692 A1 | * | 5/2005 | Yang | 248/163.1 |
| 2005/0122424 A1 | * | 6/2005 | Overstreet | 348/373 |

FOREIGN PATENT DOCUMENTS

| | | |
|---|---|---|
| CN | 101676169 | 9/2008 |
| JP | 2007264217 | 10/2007 |
| KR | 20060097355 | 9/2006 |
| KR | 20060106267 | 10/2006 |

* cited by examiner

*Primary Examiner* — Clayton E LaBalle
*Assistant Examiner* — Autumn Parker
(74) *Attorney, Agent, or Firm* — Kirschstein, et al.

(57) ABSTRACT

A stabilized mount stably supports a motion-sensitive, image capture device, such as a cellular telephone or a personal digital assistant, on a support surface, such as a tripod or analogous camera equipment. The device is operative for capturing an image over a field of view along an optical axis perpendicular to an image plane. The mount includes a holder for holding the device during image capture, and a fixed base integral with the holder and lying in a base plane perpendicular to the image plane when the base is supported by the support surface in a supported orientation. The base is operative for steadily positioning the holder and the device on the support surface in the supported orientation during the image capture.

15 Claims, 3 Drawing Sheets

STABILIZED MOUNT FOR, AND METHOD OF, STEADILY SUPPORTING A MOTION-SENSITIVE, IMAGE CAPTURE DEVICE

BACKGROUND OF THE INVENTION

This invention generally relates to a stabilized mount for, and a method of, steadily supporting motion-sensitive, image capture devices, such as stand-alone image capture devices, e.g., ultra-lightweight cameras, web cameras and camcorders, as well as other multiple use devices, such as cellular telephones, personal digital assistants, media players, game controllers, and like devices in which image capture capability has been incorporated and, more particularly, relates to isolating all such devices from unwanted motion during image capture.

Still picture and motion picture (video) cameras have, at some time during their use, been handheld by a human operator whose inherent instability tended to produce blurred still and moving images. In recent years, ultra-lightweight cameras, such as web cameras weighing less than one pound, have been developed, and the current ultra-lightweight cameras are so compact and light that they have even been incorporated into other multiple use devices, such as cellular telephones, personal digital assistants, media players, game controllers and like handheld devices. In addition to the traditional unsteadiness of a handheld camera, these handheld devices were being operated by amateur photographers, still further resulting in unstable and often unacceptable still and video images, especially during ambulatory operation.

With the increasing popularity of handheld cellular telephones with built-in still and video image capture capability, it has become more and more desirable to rigidly support such handheld devices so that the images that they capture are stable and free from unwanted movement or vibration while the image is being acquired. Yet, the known handheld devices have not been directly integrated with the capability for such devices to be mounted onto industry standard camera and video equipment mounting platforms, such as tripods and/or equipoising supports. Hence, this readily available industrial equipment cannot be used to help stabilize and/or manipulate the handheld devices.

Current methods of holding/mounting such handheld devices have been geared towards non-image capture applications. For example, some handheld devices have been equipped with global positioning systems, and have been mounted in/on vehicles or other forms of transportation by adjustable mechanisms that allow the handheld devices to be desirably positioned along one or more axes relative to a mounting platform for convenient operation by, or orientation that faces, the user. These adjustable mechanisms typically incorporated a positionable tripod mount, a semi-rigid bendable gooseneck mount, a ball end swivel mount, or other types of multi-jointed or adjustable mechanism that was connected between the handheld device and the mounting platform.

As desirable as such adjustable mechanisms have been in non-image capture applications, they are not well suited for image capture applications. For example, the known adjustable mechanisms lacked the capability to rigidly fix and fixedly orient an image plane of the handheld device perpendicularly to the mounting platform. If the image plane was not perpendicular to the mounting platform, then an equipoising support would need to be operated at an undesirable off-axis orientation in order to obtain straight on or level images. As for tripods, level indicators would not be accurate with respect to the orientation of the image to be acquired. Existing multi-jointed or adjustable mechanisms have been prone to movement or vibration due to the flexible, movable nature of the multi-part construction. Such potential vibration or movement of the orientation of the device was detrimental to stable image capture, especially when the device was in motion or subjected to external forces, such as wind.

Thus, the known adjustable mechanisms have failed to effectively and satisfactorily eliminate the problems of instability encountered in connection with operation of the ever-lighter, digital, still and motion, cameras that have been developed, and it therefore is desirable to furnish a stabilized mount particularly well suited to the special requirements of ultra-lightweight, handheld, digital devices, particularly consumer-operated video cameras and like devices, e.g., those incorporated into cellular telephones, personal digital assistants, media players, game controllers, and like handheld devices in which image capture capability has been incorporated.

SUMMARY OF THE INVENTION

One aspect of this invention is directed to a stabilized mount for steadily and stably supporting a motion-sensitive, image capture device on a support surface. The device is operative for capturing an image over a field of view along an optical axis perpendicular to an image plane. The device may be a stand-alone image capture device, e.g., an ultra-lightweight camera, a web camera, a camcorder, etc., or may be a multiple use device, such as a cellular telephone, a personal digital assistant, a media player, a game controller, and like devices in which image capture capability has been incorporated. The support surface may be a tripod, a handheld equipoising structure, or a table or countertop.

The mount includes a holder for holding the device during image capture, and a fixed base integral with the holder. The base lays in a base plane perpendicular to the image plane when the base is supported by the support surface in a supported orientation. The base is operative for steadily positioning the holder and the device on the support surface in the supported orientation during the image capture. The capability of rigidly fixing the orientation or image plane of the handheld device with respect to the support surface avoids the capture of blurry images.

Advantageously, the holder has a plurality of arms for detachably gripping a periphery of the device. Preferably, the arms are constituted of a resilient material, such as synthetic plastic or metal. The arms are spaced away from, and do not block, the field of view, or interfere with any functions of the device, i.e., buttons, connector ports, battery replacement. The holder may be customized to hold a single model of the device, or may be adapted to hold a plurality of different devices.

The base is advantageously provided with an insert having an internally threaded passage for threaded engagement with an externally threaded stud extending away from the support surface in the supported orientation during the image capture. The stud is preferably an industry standard ¼ inch-20 threaded mounting stud to enable the mount to be readily mounted on industry standard camera and video equipment mounting platforms, such as tripods and/or equipoising supports.

The base is also advantageously provided with an anti-rotation index hole for receiving an index pin extending away from the support surface in the supported orientation during the image capture. This feature insures that the handheld device is mounted and maintained without rotation in the correct orientation with respect to the camera mounting equipment. Unwanted rotation or movement of the handheld device during abrupt movements or re-positioning of the equipment is prevented. The holder and the base are preferably mirror symmetrical relative to a central plane. The insert and the index hole preferably lay in the central plane. The holder may also be designed such that it is off axis with respect to the base to accommodate special mounting requirements, or to align the optical centerline of the image capture device to the centerline of the mount.

The mount supports the device in a low mass, compact mounting profile. Without this capability, the mounting of the handheld device might prove difficult if it were used in conjunction with existing camera mounting equipment, such as environmental camera enclosures, SLR-type camera flash brackets, and the like. Tall mounts that are high in profile may also not be able to be balanced properly on equipoising support structures.

Still another aspect of this invention is directed to the method of stably supporting the motion-sensitive, image capture device on the support surface, the method being performed by capturing an image with the device over the field of view along the optical axis perpendicular to the image plane, holding the device with the holder during image capture, and steadily positioning the holder and the device on the support surface in a supported orientation during the image capture by integrally forming a fixed base with the holder, by supporting the base on the support surface, and by configuring the base to lay in a base plane perpendicular to the image plane when the base is supported by the support surface in the supported orientation.

Thus, the handheld devices are rigidly supported such that the images that they capture are stable and free from unwanted movement or vibration while the image is being acquired. Readily available industrial equipment can be used to help stabilize and/or manipulate the handheld devices.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 4:
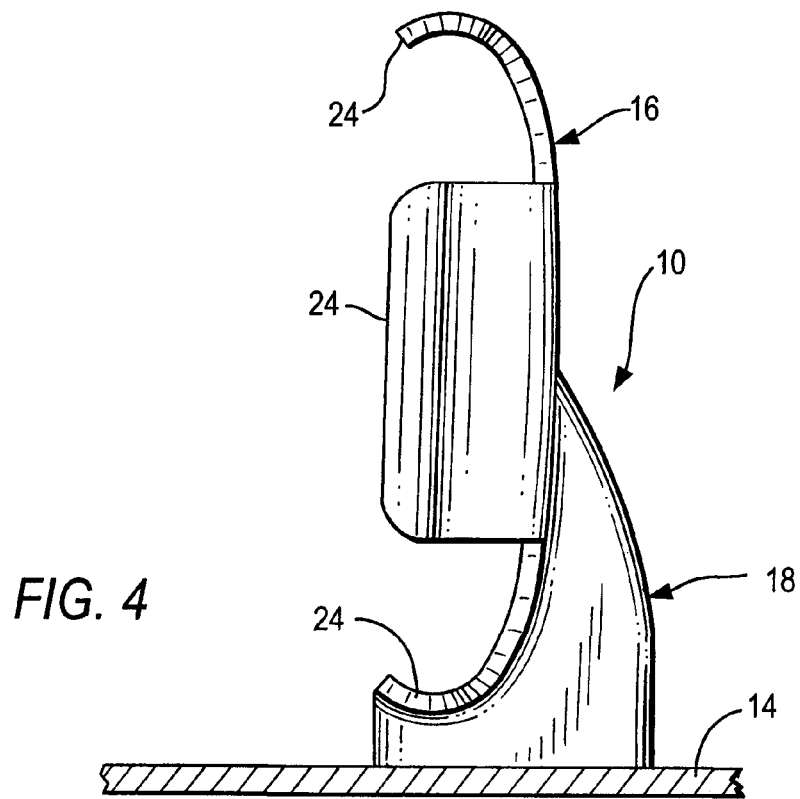
FIG. 4 is an upright side elevational view of the stabilized mount of FIG. 1 without the device.
Figure 5:
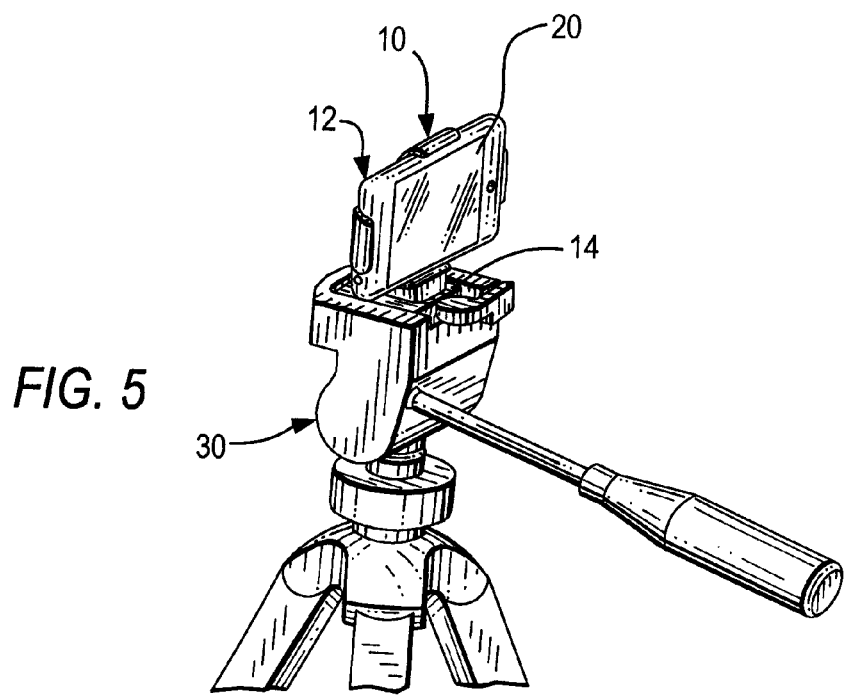
FIG. 5 is a reduced-scale, broken-away, perspective view of the stabilized mount of FIG. 1 on a tripod.
Figure 6:
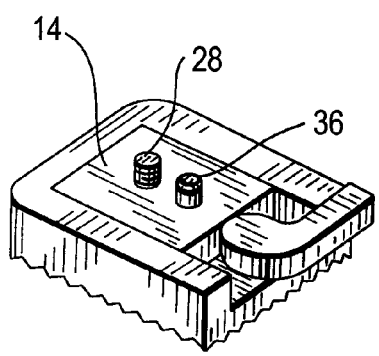
FIG. 6 is a perspective view of a detail of FIG. 5.
Figure 7:
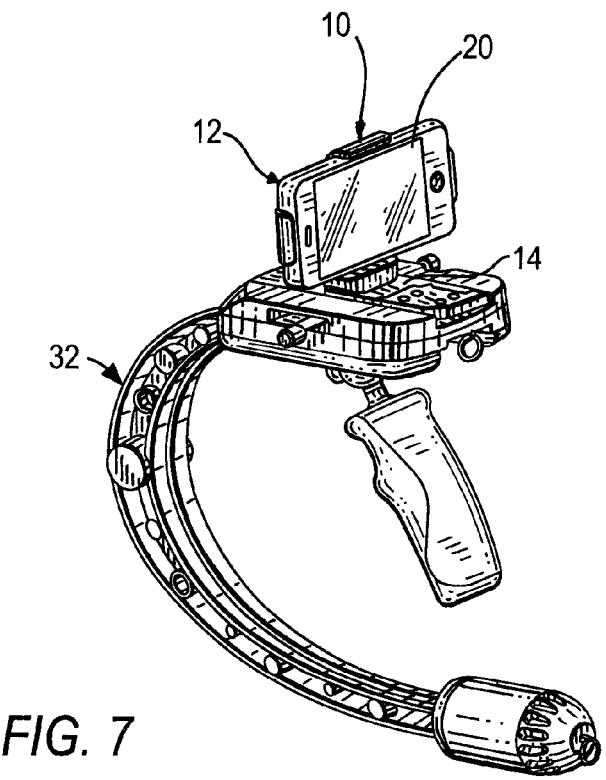
FIG. 7 is a reduced-scale, perspective view of the stabilized mount of FIG. 1 on an equipoising support structure.

Referring now to the drawings, reference numeral 10 generally identifies a stabilized mount for steadily and stably supporting a motion-sensitive, image capture device 12 on a support surface 14 (see FIGS. 4-7). The device 12 is operative for capturing an image over a field of view along an optical axis perpendicular to an image plane. The device 12 may be a stand-alone image capture device, e.g., an ultra-lightweight camera, a web camera, a camcorder, etc., or may be a multiple use device, such as a cellular telephone, a personal digital assistant, a media player, a game controller, and like devices in which image capture capability has been incorporated. The support surface 14 may be a tripod (FIG. 5), a handheld equipoising structure (FIG. 7), or a table or countertop (FIG. 4).

Figure 1:
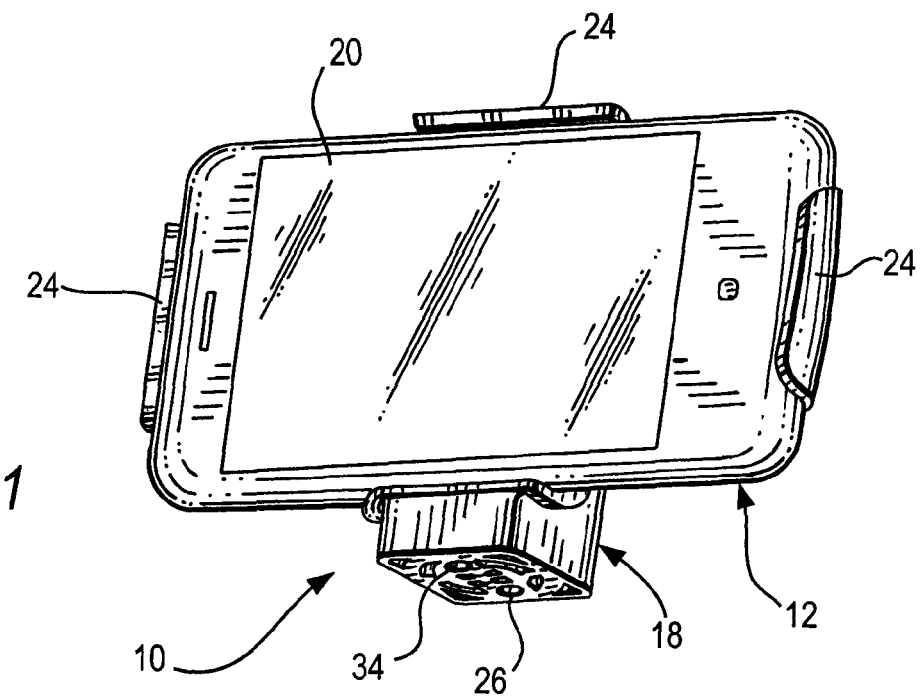
FIG. 1 is a front perspective view of a stabilized mount in which a multiple use, handheld device is held in accordance with this invention.
Figure 2:
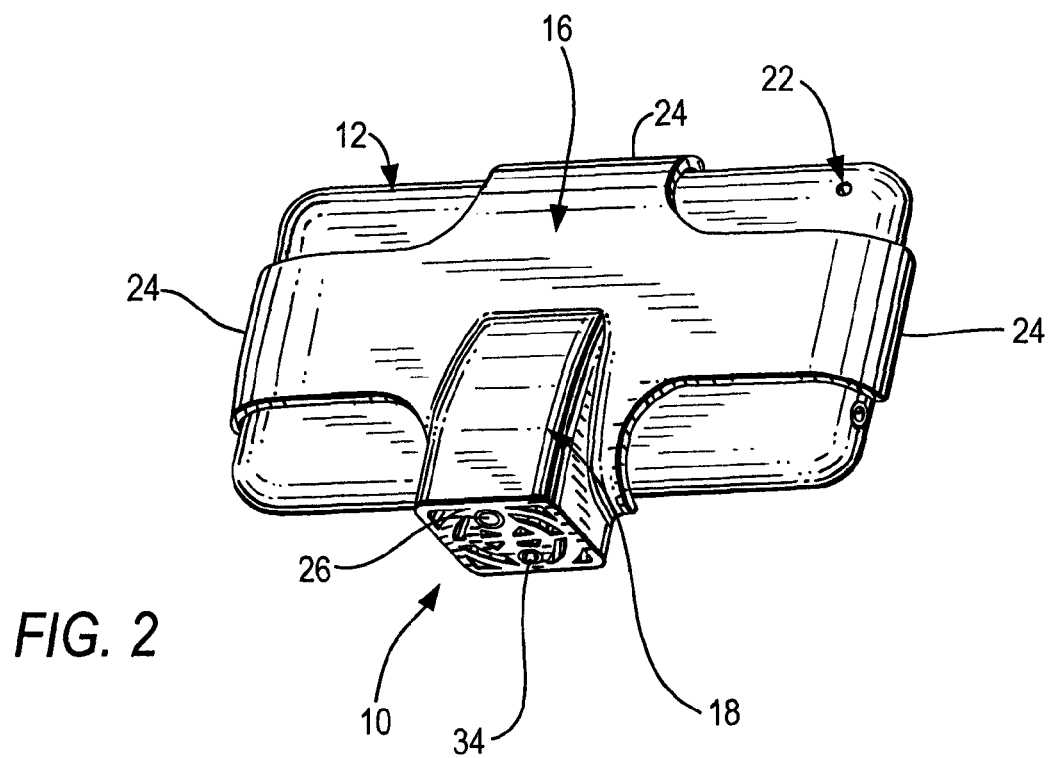
FIG. 2 is a rear perspective view of the stabilized mount of FIG. 1 in which the device is held.
Figure 3:
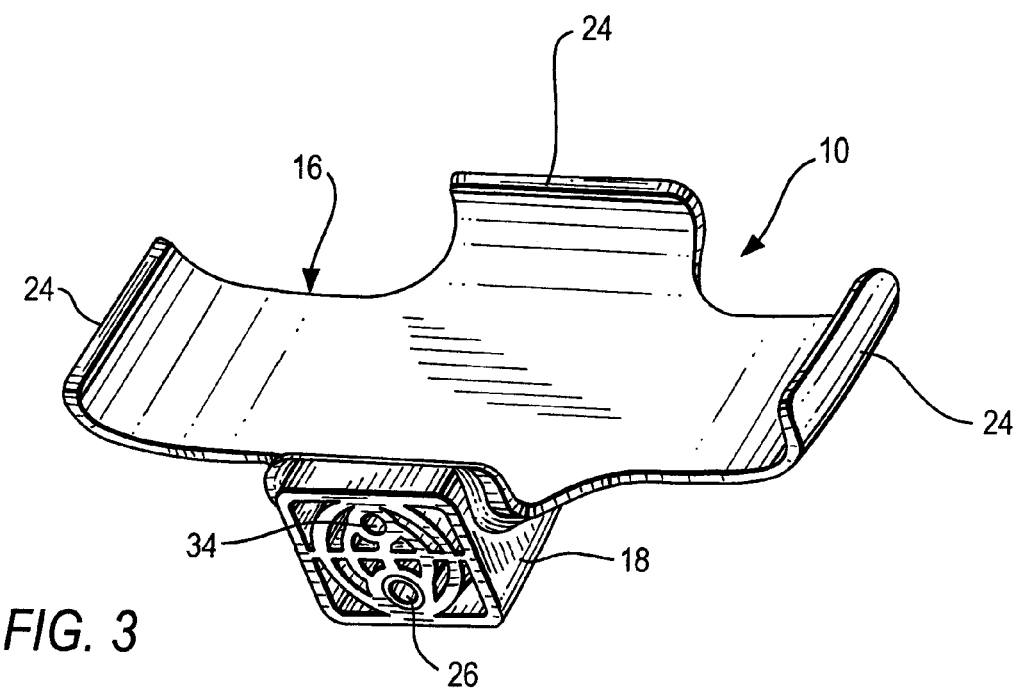
FIG. 3 is a front perspective view of the stabilized mount of FIG. 1 without the device.

As illustrated in FIGS. 1-2, the device 12 is an iPhone, which is a multimedia smartphone marketed by Apple, Inc. This device 12 has an internal solid-state imager having a two-dimensional array of cells or photosensors arranged in the image plane. The photosensors correspond to image elements or pixels in a field of view of the imager. The imager may be a charge coupled device (CCD) or a complementary metal oxide semiconductor (CMOS) device, together with associated bandpass spectral filters and electronic circuits for producing electrical signals corresponding to a two-dimensional array of pixel information over the field of view. This device 12 also has a viewfinder display 20 that is parallel to the image plane, as well as an aperture 22 (see FIG. 2) through which light passes to the imager.

The mount 10 includes a holder 16 for holding the device 12 during image capture, and a fixed base 18 integral with the holder 16. The base 18 has a bottom surface that lays in a base plane perpendicular to the image plane when the base 18 is supported by the support surface 14 in a supported orientation. The base 18 is operative for steadily positioning the holder 16 and the device 12 on the support surface 14 in the supported orientation during the image capture. The capability of rigidly fixing the orientation or image plane of the handheld device 12 with respect to the support surface 14 avoids the capture of blurry images.

Advantageously, the holder 16 has a plurality of four arms 24 for detachably gripping a periphery of the device 12. The arms 24 grip upper, lower and opposite side edges of the device 12 and clamp the device 12 in place. Preferably, the arms 24 are curved at their ends and are constituted of a resilient material, such as synthetic plastic or metal, that yield to enable the device 12 to be snap-fitted to the holder 16. The arms 24 are spaced away from the aperture 22, and do not block or obstruct the field of view, or interfere with any functions of the device 12, e.g., buttons, connector ports, battery replacement. The holder 16 may be customized to hold a single model of the device 12, or may be adapted to hold a plurality of different devices 12. The customized mount 10 can be sold separately from, or in conjunction with, a specific model of the device 12. The holder 16 may be provided with integral weights for balance.

The base 18 is advantageously provided with an insert 26 having an internally threaded passage for threaded engagement with an externally threaded stud 28 (see FIG. 6) extending away from the support surface 14 in the supported orientation during the image capture. The stud 28 is preferably an industry standard ¼ inch-20 threaded mounting stud to enable the mount 10 to be readily mounted on industry standard camera and video equipment mounting platforms, such as tripods 30 (see FIG. 5) and/or equipoising supports 32 (see FIG. 7).

The base 18 is also advantageously provided with an anti-rotation index hole 34 for receiving an index pin 36 (see FIG. 6) extending away from the support surface 14 in the supported orientation during the image capture. This feature insures that the handheld device 12 is mounted and maintained without rotation in the correct orientation with respect to the camera mounting equipment 30, 32. Unwanted rotation or movement of the handheld device 12 during abrupt movements or re-positioning of the equipment 30, 32 is prevented. The holder 16 and the base 18 are illustrated as, but need not be, mirror symmetrical relative to a central plane, and the insert 26 and the index hole 34 preferably lay in the central plane. The insert 26 and the index hole 34 are mutually arranged in a predetermined relationship that matches that of the stud 28 and the index pin 36. The holder 16 may also be designed such that it is off axis with respect to the base 18 to accommodate special mounting requirements, or to align the optical centerline of the device 12 to the centerline of the mount 10.

The mount 10 supports the device 12 in a low mass, compact mounting profile. Without this capability, the mounting of the handheld device 12 might prove difficult if it were used in conjunction with existing camera mounting equipment, such as environmental camera enclosures, SLR-type camera flash brackets, and the like. Tall mounts that are high in profile may also not be able to be balanced properly on equipoising support structures.

It will be understood that each of the elements described above, or two or more together, also may find a useful application in other types of constructions differing from the types described above.

While the invention has been illustrated and described as embodied in a stabilized mount for stably supporting a motion-sensitive, image capture device on a support surface, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. A stabilized mount for stably supporting a motion-sensitive, image capture device on a support surface, the device being operative for capturing an image over a field of view along an optical axis perpendicular to an image plane, the mount comprising:
    a holder for holding the device during image capture, the holder having a plurality of resilient arms for detachably gripping peripheral edges of the device with a snap fit;
    a handheld equipoising structure on which the support surface is mounted; and
    a base fixed, and immovable relative, to the holder and having a bottom surface lying in a base plane that is always perpendicular to the image plane when the base is supported by the support surface in a supported orientation, the base being of one-piece with the holder and operative for non-adjustably positioning the holder and the device on the support surface in the supported orientation during the image capture.

2. The stabilized mount of claim 1, wherein the arms are spaced away from, and do not block, the field of view.

3. The stabilized mount of claim 1, wherein the holder is customized to hold a single model of the device.

4. The stabilized mount of claim 1, wherein the holder is adapted to hold a plurality of devices.

5. The stabilized mount of claim 1, wherein the base has an insert with an internally threaded passage for threaded engagement with an externally threaded stud extending away from the support surface in the supported orientation during the image capture.

6. The stabilized mount of claim 5, wherein the base has an index hole for receiving an index pin extending away from the support surface to prevent rotation of the base relative to the support surface in the supported orientation during the image capture.

7. The stabilized mount of claim 6, wherein the insert and the index hole are mutually arranged in a predetermined relationship.

8. A method of stably supporting a motion-sensitive, image capture device on a support surface, the method comprising the steps of:
    capturing an image with the device over a field of view along an optical axis perpendicular to an image plane;
    holding the device with a holder during image capture by configuring the holder with a plurality of resilient arms that detachably grip peripheral edges of the device with a snap fit;
    mounting the support surface on a handheld equipoising structure; and
    non-adjustably positioning the holder and the device on the support surface in a supported orientation during the image capture by fixing a base to be of one piece with the holder so that the base is immovable relative to the holder, by supporting the base on the support surface, and by configuring the base with a bottom surface that lays in a base plane that is always perpendicular to the image plane when the base is supported by the support surface in the supported orientation.

9. The method of claim 8, and spacing the arms away from the field of view.

10. The method of claim 8, and customizing the holder to hold a single model of the device.

11. The method of claim 8, and adapting the holder to hold a plurality of devices.

12. The method of claim 8, and forming the base with an insert having an internally threaded passage for threaded engagement with an externally threaded stud extending away from the support surface in the supported orientation during the image capture.

13. The method of claim 12, and preventing rotation of the base relative to the support surface by forming the base with an index hole for receiving an index pin extending away from the support surface in the supported orientation during the image capture.

14. The method of claim 13, and positioning the insert and the index hole in a mutually predetermined relationship.

15. A stabilized mount for stably supporting a motion-sensitive, image capture device on a support surface, the device being operative for capturing an image over a field of view along an optical axis perpendicular to an image plane, the mount comprising:
    a holder for holding the device during image capture, the holder having a plurality of resilient arms for detachably gripping peripheral edges of the device with a snap fit; and a base fixed, and immovable relative, to the holder and having a bottom surface lying in a base plane that is always perpendicular to the image plane when the base is supported by the support surface in a supported orientation, the base being of one-piece with the holder and operative for non-adjustably positioning the holder and the device on the support surface in the supported orientation during the image capture, the base having an index hole for receiving an index pin extending away from the support surface to prevent rotation of the base relative to the support surface in the supported orientation during the image capture.

* * * * *